(12) United States Patent
Sen et al.

(10) Patent No.: US 8,489,463 B2
(45) Date of Patent: Jul. 16, 2013

(54) PROVIDING A MARKETPLACE FOR SENSOR DATA

(75) Inventors: Mainak Sen, Fremont, CA (US);
Debojyoti Dutta, Santa Clara, CA (US);
Nagarajan Duraisamy, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 244 days.

(21) Appl. No.: 12/908,794

(22) Filed: Oct. 20, 2010

(65) Prior Publication Data

US 2012/0101912 A1  Apr. 26, 2012

(51) Int. Cl.
*G06Q 30/00* (2012.01)

(52) U.S. Cl.
USPC .......................................... 705/26.1; 705/27.1

(58) Field of Classification Search
USPC .................... 705/26, 27, 26.1, 27.1
See application file for complete search history.

(56) References Cited

U.S. PATENT DOCUMENTS 6,202,051 B1 * 3/2001 Woolston ................... 705/26.3

OTHER PUBLICATIONS

Path Data in Marketing: An Integrative Framework and Prospectus for Model Building, Sam K Hui, Peter S Fader, Eric T Bradlow. Marketing Science. Linthicum: Mar./Apr. 2009. vol. 28, Iss. 2; p. 320, downloaded from ProQuestDirect on the Internet on Aug. 3, 2012, 25 pages.*
Is it legal?: privacy, Anonymous. Newsletter on Intellectual Freedom. Chicago: Sep. 2010. vol. 59, Iss. 5; p. 226, downloaded from ProQuestDIrect on the Internet on Aug. 3, 2012, 10 pages.*

* cited by examiner

*Primary Examiner* — James Zurita
(74) *Attorney, Agent, or Firm* — Baker Botts L.L.P.

(57) ABSTRACT

In one embodiment, a method includes accessing first information identifying a sensor-data set that includes sensor-data from multiple sensor-data streams from multiple sensors over a period of time, with the sensor data from the sensor-data streams having been combined with each other based on a relationship of the sensor data to a sensor subject; accessing second information identifying one or more offers to purchase the sensor-data set; and matching one of the offers with the sensor-data set to facilitate a purchase of the sensor-data set based at least on the one of the offers matched to the sensor-data set.

40 Claims, 6 Drawing Sheets

US 8,489,463 B2

PROVIDING A MARKETPLACE FOR SENSOR DATA

TECHNICAL FIELD

This disclosure generally relates to sensor networks.

BACKGROUND

A sensor network may include distributed autonomous sensors. Uses of sensor networks include but are not limited to military applications, industrial process monitoring and control, machine health monitoring, environment and habitat monitoring, utility usage, healthcare applications, home automation, and traffic control. A sensor in a sensor network is typically equipped with a communications interface, a controller, and an energy source (such as a battery).

DESCRIPTION OF EXAMPLE EMBODIMENTS

Overview

In one embodiment, a method includes accessing first information identifying a sensor-data set that includes sensor-data from multiple sensor-data streams from multiple sensors over a period of time, with the sensor data from the sensor-data streams having been combined with each other based on a relationship of the sensor data to a sensor subject; accessing second information identifying one or more offers to purchase the sensor-data set; and matching one of the offers with the sensor-data set to facilitate a purchase of the sensor-data set based at least on the one of the offers matched to the sensor-data set.

Description

Figure 1:
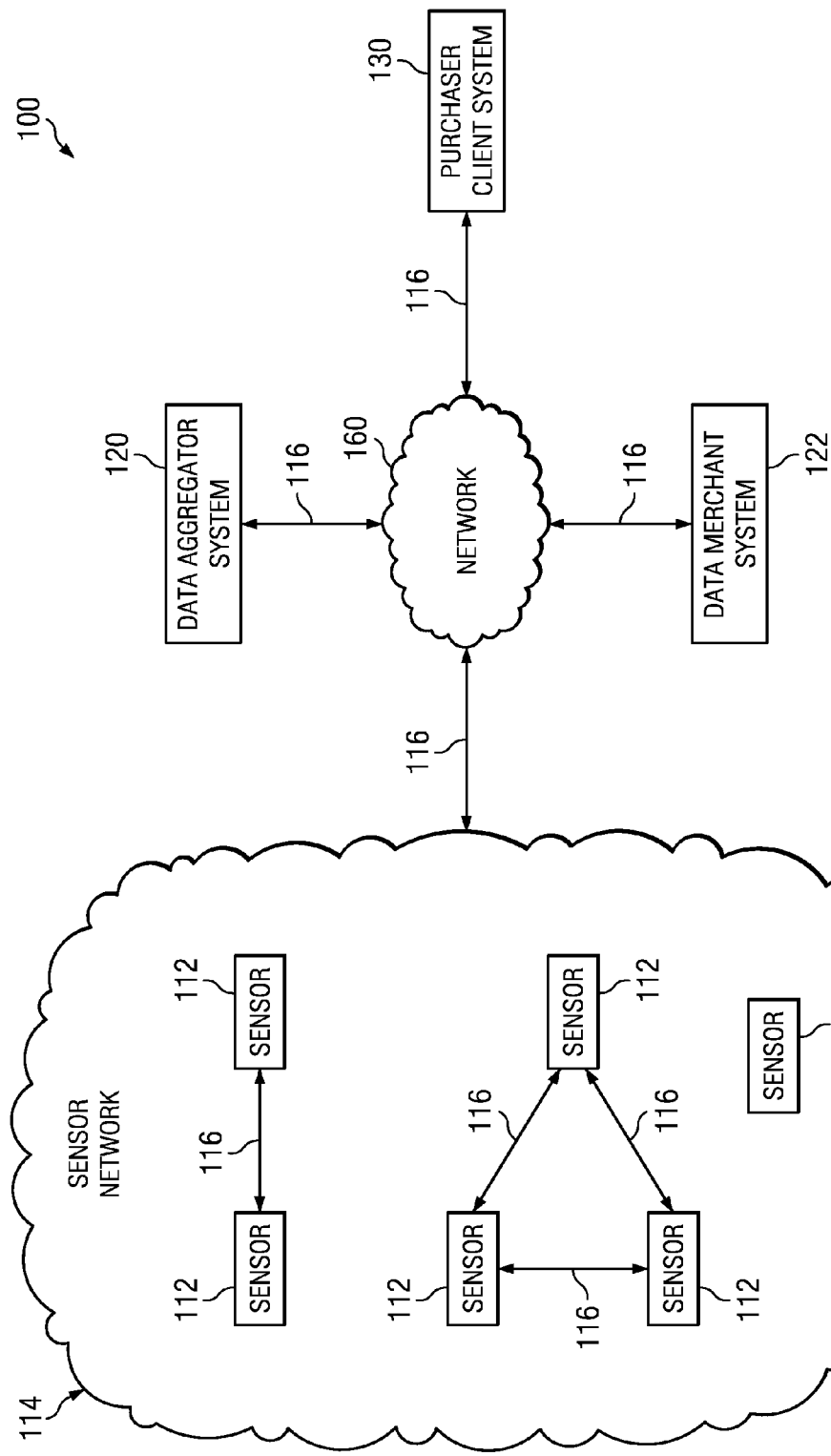
FIG. 1 illustrates an example system for providing a marketplace for sensor data.

FIG. 1 illustrates an example system 100 for providing a marketplace for sensor data. System 100 includes a sensor network 114 (which includes one or more sensors 112), a data-aggregator system 120, a data-merchant system 122, and a purchaser-client system 130 connected to each other by a communication network 160. Although FIG. 1 illustrates a particular arrangement of sensors 112, sensor network 114, data-aggregator system 120, data-merchant system 122, purchaser-client system 130, and communication network 160, this disclosure contemplates any suitable arrangement of sensors 112, sensor network 114, data-aggregator system 120, data-merchant system 122, purchaser-client system 130, and communication network 160. As an example and not by way of limitation, two or more of sensor network 114, data-aggregator system 120, data-merchant system 122, and purchaser-client system 130 may be connected to each other directly, bypassing a communication network 160. As another example, one or more sensors 112 may be connected directly to communication network 160, without being part of a sensor network 114. As another example, two or more of sensor network 114, data-aggregator system 120, data-merchant system 122, and purchaser-client system 130 may be physically or logically co-located with each other in whole or in part. Moreover, although FIG. 1 illustrates a particular number of sensors 112, sensor networks 114, data-aggregator systems 120, data-merchant systems 122, purchaser-client systems 130, and communication networks 160, this disclosure contemplates any suitable number of sensors 112, sensor networks 114, data-aggregator systems 120, data-merchant systems 122, purchaser-client systems 130, and communication networks 160. As an example and not by way of limitation, system 100 may include multiple sensor networks 114, data-aggregator systems 120, data-merchant systems 122, purchaser-client systems 130, or communication networks 160.

This disclosure contemplates any suitable communication network 160. As an example and not by way of limitation, one or more portions of communication network 160 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Communication network 160 may include one or more communication networks 160. Similarly, this disclosure contemplates any suitable sensor network 114. As an example and not by way of limitation, one or more portions of sensor network 114 may include an ad hoc network, an intranet, an extranet, a VPN, a LAN, a WLAN, a WAN, a WWAN, a MAN, a portion of the Internet, a portion of the PSTN, a cellular telephone network, or a combination of two or more of these. Sensor network 114 may include one or more sensor networks 114.

Connections 116 may connect sensor network 114, data-aggregator system 120, data-merchant system 122, and purchaser-client system 130 to communication network 160 or to each other. Similarly, connections 116 may connect sensors to each other in sensor network 114 (or to other equipment in sensor network 114) or to communication network 160. This disclosure contemplates any suitable connections 116. In particular embodiments, one or more connections 116 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)) or optical (such as for example Synchronous Optical Network (SONET) or Synchronous Digital Hierarchy (SDH)) connections. In particular embodiments, one or more connections 116 each include an ad hoc network, an intranet, an extranet, a VPN, a LAN, a WLAN, a WAN, a WWAN, a MAN, a portion of the Internet, a portion of the PSTN, a cellular telephone network, another connection 116, or a combination of two or more such connections 116. Connections 116 need not necessarily be the same throughout system 100. One or more first connections 116 may differ in one or more respects from one or more second connections 116.

Sensor network 114 includes one or more sensors 112. In particular embodiments, a sensor 112 includes one or more devices that may measure or otherwise sense one or more physical quantities and convert the sensed physical quantities into or generate based on the sensed physical quantities one or more signals. Example physical quantities include but are not limited to chemical concentration, electrical fields, gravity, humidity, light, location, magnetic fields, motion, orientation, pressure, shear stress, sound, temperature, tension (or compression), torsion, and vibration. A signal may be a digital or analog electrical signal. Example sensors include but are not limited to an audio sensor, electricity meter, gas meter, Global Positioning System (GPS) locator, motion detector, potentiometer (which may, for example, operate as a fuel gauge), pressure sensor (which may, for example, operate as an altimeter, barometer, depth sensor, flow sensor, or leak sensor), still or video camera, thermometer, and water meter. In particular embodiments, sensor 112 may include one or more sensors 112 and may be unitary or distributed. This disclosure contemplates any suitable sensors 112.

In particular embodiments, one or more sensors 112 each include one or more devices that may send, receive, or forward information (such as sensor data) over a communication channel, for example to one or more other sensors 112 or other equipment in sensor network 114 or to data-aggregator system 120. In particular embodiments, sensor data are one or more signals that one or more sensors 112 have converted one or more sensed physical quantities into or generated based on one or more sensed physical quantities. In particular embodiments, a sensor-data stream is a sequence of sensor data generated by a sensor 112, which sensor 112 may transmit more or less continuously as it generates the sensor data or periodically in batches. Reference to sensor data may encompass a sensor-data stream, and vice versa, where appropriate. Sensor data may relate to a sensor subject. This disclosure contemplates any suitable sensor subject. As an example and not by way of limitation, a sensor subject may be a person (or group of persons), place (such as for example a geographical location), thing (such as for example a building, road, or car model), concept, discipline, time period, event, field of study, interest, issue, knowledge base, topic, or other sensor subject. Sensor data or a sensor-data stream may relate to a sensor subject in any suitable way. As an example and not by way of limitation, sensor data may relate to a sensor subject because one or more sensors 112 generated the sensor data from one or more stimuli produced by the sensor subject. As another example, sensor data may relate to a sensor subject because the sensor data may provide insight or further understanding of the sensor subject. As another example, sensor data may relate to a sensor subject because it may help detect or predict the occurrence of one or more problems or events concerning the sensor subject. As another example, sensor data may relate to a sensor subject because it may facilitate monitoring of the sensor subject.

In particular embodiments, when a sensor 112 transmits sensor data, sensor 112 may tag the sensor data or otherwise identify it as being related to a particular sensor subject. As an example and not by way of limitation, a sensor 112 may have one or more sensor identifiers (IDs) and generate only particular sensor data related to a particular sensor subject. One or more sensors 112 may be connected to a network (such as for example an Internet Protocol (IP) network) that assigns unique identifiers to each terminal node. A network host may assign an IP address to each sensor 112, and the IP address assigned to sensor 112 may provide a sensor ID for sensor 112. As another example, one or more sensors 112 may each have a network interface with a unique ID (such as for example a Media Access Control (MAC) address, an Ethernet hardware address (EHA) or another hardware address, an adapter address, or a physical address) and the unique ID of the network interface may provide a sensor ID for sensor 112. As another example, geographic information about a sensor 112 (such as for example the geographic location of sensor 112 as identified by the Global Positioning System (GPS)) may provide a sensor ID for sensor 112. As another example, one or more properties of a sensor 112 (such as for example its sensor type) may provide a sensor ID for sensor 112. When a sensor transmits sensor data that it has generated, sensor 112 may transmit the sensor data along with one or more sensor IDs of sensor 112. The present disclosure contemplates any suitable sensor IDs containing any suitable information. As an example and not by way of limitation, a sensor ID for a sensor 112 may be a combination of two or more of the sensor IDs described above, where appropriate. Moreover, the present disclosure contemplates any suitable tags for sensor data.

Data-aggregator system 120 (or another device in system 100) may use one or more tags (such as for example sensor IDs) to determine that sensor data is related to a particular sensor subject. In addition or as an alternative to sensor data being tagged or otherwise identified as being related to a particular sensor subject by sensor 112 that generated the sensor data, another sensor 112, data-aggregator system 120, or other suitable equipment in sensor network 114 may tag or otherwise identify the sensor data as being related to a particular sensor subject. As an example and not by way of limitation, data-aggregator system 120 may receive one or more data sets from one or more sensors 112. Sensor data in the data set may include or have associated with it tags identifying sensor IDs of sensors 112. Data-aggregator system 120 may determine a sensor subject related to the data set by querying the sensor IDs to a suitable record (such as for example a lookup table or index) indicating the sensor subject associated with the sensor IDs.

In particular embodiments, a sensor 112 may have one or more resources for carrying out its functions. These resources may include but are not limited to processing capabilities, memory, and power. Sensor 112 may have one or more processors and one or memory devices. This disclosure contemplates sensor 112 having any suitable number of any suitable processors and memory devices. Sensor 112 may have an internal power source (such as for example one or more rechargeable or replaceable batteries) or receive power from an external power source (such as for example an electrical grid). Sensor 112 may include one or more solar panels to provide power to it. This disclosure contemplates sensors 112 having any suitable sources of power. Other resources of sensor 112 may but need not in all cases include software, such as for example application software, middleware, system software, firmware, and device drivers. This disclosure contemplates sensor 112 including any suitable resources for carrying out its functions. All sensors 112 in sensor network 114 need not have the same resources; different sensors 112 may have different resources. As an example and not by way of limitation, one or more first sensors 112 may each have substantial processing capabilities, large amounts of memory, and almost unlimited power, while one or more second sensor nodes 112 may each have very limited processing capabilities, memory, and power. As another example, one or more first sensors 112 may each have software running on them enabling them to perform a variety of functions (including higher-level ones such as tagging sensor data), while one or more second sensors 112 may each have less or scaled-down software running on them enabling them to perform fewer functions (or only lower-level ones). This disclosure contemplates any suitable diversity in the resources available to sensors 112 throughout system 100.

In particular embodiments, data-aggregator system 120 receives one or more data streams from one or more sensors 112 in sensor network 114 and combines sensor data from those data streams with each other based on relationships of the sensor data to one or more sensor subjects. Data-aggregator system 120 may include one or more computer systems (such as for example servers) and may be unitary or distributed. Data-aggregator system 120 may include one or more data-aggregator systems 120. This disclosure contemplates any suitable data-aggregator system 120. Data-aggregator system 120 may collect data from sensors 112 or sensor network 114. As an example and not by way of limitation, a sensor 112 may store sensor data and transmit it to data-aggregator system 120 periodically in batches. As another example, sensor 112 may continuously transmit sensor data to data-aggregator system 120 as it generates the sensor data. As another example, sensor 112 may transmit sensor data to data-aggregator system 120 after receiving a request for sensor data from, for example, data-aggregator system 120 or data-merchant system 122. As another example, sensor 112 may transmit sensor data to data-aggregator system 120 after receiving an indication that one or more persons or entities (which may be a sensor subject of the sensor data) have consented to or authorized the transmission of the sensor data.

In particular embodiments, data-aggregator system 120 may store, categorize, combine, and file data from one or more data streams from one or more sensors 112 over time. In particular embodiments, data-aggregator system 120 may combine and store data sets based on a variety of criteria. For example, data-aggregator system 120 may combine data sets from a plurality of data streams based on a particular sensor subject, such as for example a specific person or group of persons the sensor is monitoring, a location or environment the sensor is monitoring, a type of sensor, a time period or event when the sensor recorded the data, other appropriate criteria, or a combination of two or more such criteria. As another example, data-aggregator system 120 may combine data sets from a plurality of data streams based on time, such as for example by using a moving average or auto-regressive algorithm. As another example, data-aggregator system 120 may combine data sets from a plurality of data streams based on the geography of sensors 112 that generated the data streams, such as for example aggregating data based on the spatial correlation of sensors 112. As another example, data-aggregator system 120 may combine data sets from a plurality of data streams based on pre-defined characteristics of the data streams, such as for example aggregating data based on a query, offer, or user-input that specifies a particular suitable characteristic that may serve as a basis for aggregation.

In particular embodiments, data-aggregator system 120 may anonymize one or more data sets, such as for example by removing information from a data set that identifies (directly or indirectly) one or more of the subjects associated with the data set. In particular embodiments, data-aggregator system 120 may perform a data integrity function on one or more data sets, such as for example by encrypting the data, using digital certificates, having the data authenticated by a third-party system, or by using trusted data collectors, wherein the sensor data is generated and data integrity is maintained through limited APIs to access the database. In particular embodiments, data-aggregator system 120 may tag one or more data sets with information describing how the data has been combined.

In particular embodiments, sensor network 114 may be probed periodically for sensor data. As an example and not by way of limitation, a query may be routed from a requesting system (such as for example data-aggregator system 120, data-merchant system 122, or purchaser-client system 130) to one or more sensors 112 in sensor network 114. Sensor 112 may respond by transmitting a data stream containing some or all of the data requested. Data-aggregator system 120 may then store, categorize, combine, and file some or all of this data. Data-aggregator system 120 may also transmit some or all of this data to one or more other systems, such as for example data-merchant system 122 or purchaser-client system 130.

In particular embodiments, data-merchant system 122 functions as a broker for sensor data from one or more sensors 112 in sensor network 114. Data-merchant system 122 may include one or more computer systems (such as for example servers) and may be unitary or distributed. Data-merchant system 122 may include one or more data-merchant systems 122. In particular embodiments, data-merchant system 122 provides an infrastructure for buying, selling, transmitting, and receiving sensor data from sensors 112. As an example and not by way of limitation, data-merchant system 122 may receive one or more offers to purchase one or more data sets from sensors 112. Data-merchant system 122 may then transmit a request or query to data-aggregator system 120 for information on the data sets available to or stored by data-aggregator system 120. Data-aggregator system 120 may then transmit information to data-merchant system 122 describing the data sets available to or stored by data-aggregator system 120. Data-merchant system 122 may then compare the offers to purchase with the data sets available to or stored by data-aggregator system 120 and match one or more of the offers with one or more of the data sets to facilitate a purchase of the one or more of the data sets based on the matching of the offers and the data sets. As another example, data-merchant system 122 may receive one or more offers to purchase one or more data sets relating to particular sensors or particular sensor subjects from sensors 112. Data-merchant system 122 may then transmit a request or query to data-aggregator system 120 for information on the relevant data sets available to or stored by data-aggregator system 120. One or more sensors 112 may tag or otherwise identify sensor data as relating to a particular sensor subject. In addition or as an alternative to sensor data being tagged or otherwise identified as being related to a particular sensor subject by sensors 112, one or more sensors 112 may have a sensor ID that identifies the particular sensor or a particular sensor subject. Data-aggregator system 120 may then determine the relevant data sets available to or stored by data-aggregator system 120 by analyzing the tags, sensors IDs, or other identifying information on the sensor data generated by sensors 112. Data-aggregator system 120 may then transmit information to data-merchant system 122 describing the relevant data sets available to or stored by data-aggregator system 120. Data-merchant system 122 may then compare the offers to purchase with the relevant data sets available to or stored by data-aggregator system 120 and match one or more of the offers with one or more of the relevant data sets to facilitate a purchase of the one or more of the data sets based on the matching of the offers and the data sets.

In particular embodiments, data-merchant system 122 may facilitate the purchase of sensor data sets from sensors 112 by determining costs and facilitating payments between relevant parties. As an example and not by way of limitation, data merchant 122 may receive one or more offers to purchase one or more data sets from sensors 112. Data-merchant system 122 may then determine the aggregate cost of purchasing the data sets. If there are a plurality of sellers of the sensor data, data-merchant system 122 may facilitate the sorting of prices and offers, such as for example finding the lowest priced data sets or data sets with a specified price range. If there are a plurality of offers from a plurality of purchasers, data-merchant system 122 may facilitate the dividing or sharing this aggregate cost among the purchasers. Data-merchant system 122 may also facilitate payment to one or more owners or brokers of the sensor data. Data-merchant system 122 may also facilitate payment of a commission to the marketplace owner (such as for example the owner of data-merchant system 122).

In particular embodiments, if particular sensor data sets are available but not currently stored by data-aggregator system 120, data-aggregator system 120 may facilitate the generation or acquisition of such data sets from sensors 112. As another example, data-merchant system 122 may receive one or more offers to purchase one or more data sets relating to particular sensors or particular sensor subjects from sensors 112. Data-merchant system 122 may then transmit a request or query to data-aggregator system 120 for information on the relevant data sets available to data-aggregator system 120. One or more sensors 112 may tag or otherwise identify sensor data as relating to a particular sensor subject. In addition or as an alternative to sensor data being tagged or otherwise identified as being related to a particular sensor subject by sensors 112, one or more sensors 112 may have a sensor ID that identifies the particular sensor or a particular sensor subject. One or more sensors 112 may also have a cost associated with it, such as for example a price of data set in terms of legal currency per byte of sensor data. Data-aggregator system 120 may then determine the relevant data sets available to data-aggregator system 120 by querying sensors 112 for sensor data or analyzing recorded sensors data relating to the tags, sensors IDs, or other identifying information on the sensor data generated by sensors 112. Data-aggregator system 120 may also compute the resources needed to gather that data, such as for example processing resources, storage resources, time, cost, or other suitable resources. Data-aggregator system 120 may then transmit information to data-merchant system 122 describing the relevant data sets available to data-aggregator system 120. Data-merchant system 122 may then compare the offers to purchase with the relevant data sets available to data-aggregator system 120 and match one or more of the offers with one or more of the relevant data sets to facilitate a purchase of the one or more of the data sets based on the matching of the offers and the data sets.

In particular embodiments, data-merchant system 122 may facilitate transmitting purchased sensor data sets from sensors 112 to a purchaser. As an example and not by way of limitation, data-merchant system 122 may receive one or more indications that one or more data sets from sensors 112 have been purchased. Data-merchant system 122 may then transmit a command to data-aggregator system 120 to transmit the one or more data sets to another system (such as for example data-merchant system 122 or purchaser-client system 130). In particular embodiments, data-aggregator system 120 and data-merchant system 122 may be contained in a single system that acts as both an aggregator and broker of sensor data.

In particular embodiments, purchaser-client system 130 may purchase sensor data by accessing data-merchant system 122 through communication network 160. As an example and not by way of limitation, purchaser-client system 130 may access a website hosted by or associated with data-merchant system 122. Data-merchant system 122 may facilitate accessing and matching offers to sell or purchase sensor data using one or more navigation applications. Navigation applications include search applications that enable keyword searches of listings in data-merchant system 122 and browse applications that allow users to browse various category, catalogue, or inventory data structures of listings in data-merchant system 122. This disclosure contemplates any suitable navigation application for facilitating accessing and matching offers to sell or purchase sensor data.

In particular embodiments, data-merchant system 122 may utilize a client-server architecture for hosting a broker platform for sensor data. As an example and not by way of limitation, data-merchant system 122 may comprises one or more API servers, web servers, database servers, and application servers. An API server and web server may provide programmatic and web interfaces. A database server may facilitate access to one or more databases. An application server may host one or more applications. Data-merchant system 122 may host one or more broker applications and payments applications. Data-merchant system 122 may provide a various functions and services to purchasers (via, for example, purchaser-client system 130) who access data-merchant system 122. As an example and not by way of limitation, data-merchant system 122 may provide a number of listing, price-setting, and purchasing mechanisms whereby a seller of sensor data may list sensor data for sale, a purchaser may express interest in or indicate a desire to purchase such sensor data, a price may be set for purchasing the sensor data, and a purchaser and seller may be matched to facilitate a purchase of such sensor data. Data-merchant system 122 may facilitate such a purchase using one or more broker applications, which may implement the listing, price-setting, and purchasing mechanisms described above. Broker applications include auction applications that support auction-format listing and price setting mechanisms (such as for example English auctions, Dutch auctions, Vickrey auctions, Reverse auctions, Short-bid auctions). Broker applications also include fixed-price applications that supports fixed-priced listing formats (such as for example classified advertisement-type listings, catalogue listings) and buyout-type listings (such as for example auctions listings containing a set price that any bidder may accept at any time to end the auction and purchase the item). This disclosure contemplates any suitable broker application for facilitating a purchase of sensor data. In particular embodiments, a broker application may facilitate setting purchase prices and generating pricing structures for sensor data from sensors 112. As an example and not by way of limitation, a premium price may be charged for real-time sensor data compared with data that has been aggregated and stored for a time period. As another example, a premium price may be charged for exclusive access to data from one or more sensors 112. As another example, a premium price may be charged for aggregated sensor data that has been sorted and filtered. This disclosure contemplates any suitable prices and price structures for purchasing sensor data. In particular embodiments, data-merchant system 122 may facilitate the rating and tracking of sellers of sensor data, allowing potential purchasers to, for example, judge the marketability of a particular seller's sensor data.

In particular embodiments, data-merchant system 122 may facilitate listing of sensor data for sale using one or more listing management applications that enable sellers to author and manage such listings. As an example and not by way of limitation, a seller of sensor data may generate one or more listings on data-merchant system 122 offering to sell one or more sensor data sets. The listings may be, for example, auction-format listings, fixed-price listings, or buyout-type listings. The listings may include, for example, information regarding the sensor data being offered, a price for purchasing the sensor data, and any other information regarding the offer to sell or the sensor data. A purchaser, via for example purchaser-client system 130, may then access these listings on data-merchant system 122, for example, by accessing a website hosted or associated with data-merchant system 122. The purchaser may then place a bid in response to an offer to sell sensor data, accept or reject the offer, or generate a counter-offer. As another example, a potential purchaser of sensor data may generate one or more listings on data-merchant system 122 offering to buy one or more sensor data sets. The listings may be, for example, auction-format listings (such as for example a reverse auction), fixed-price listings, or buyout-type listings. The listings may include, for example, information regarding the sensor data the purchaser is expressing an interest in or indicating a desire to purchase, a price for purchasing the sensor data, and any other information regarding the offer to buy or the sensor data. A seller, via for example data-aggregator system 120, may then access these listings on data-merchant system 122, for example, by accessing a website hosted or associated with data-merchant system 122. The seller may then place a bid in response to an offer to buy sensor data, accept or reject an offer, or generate a counter-offer. This disclosure contemplates any suitable method for facilitating a purchase of sensor data utilizing the resources of system 100. In particular embodiments, data-merchant system 122 may facilitate payment between parties, such as for example from a purchaser to a seller of sensor data. In particular embodiment, data-merchant system 122 may facilitate transfer of sensor data between parties, such as for example from a seller of sensor data to a purchaser. As an example and not by way of limitation, data-merchant system 122 may facilitate a peer-to-peer data transfer of sensor data from a seller to a purchaser.

In particular embodiments, data-merchant system 122 may facilitate ranking the quality of sensor data. Sensor data sets, sensors data streams, sensors 112, or sensor 114 may be given a quality score related to the data in the sensor data sets, sensor data streams, sensors 112, or sensor network 114. The quality score may be based on a variety of criteria, such as for example time lag, sampling rate, sensor reliability, sensor sensitivity, sensor type, sensor location, sensor subject type, prior history of the seller of the sensor data, a combination of two or more of these criteria, or other suitable criteria. In particular embodiments, data-merchant system 122 may facilitate the purchase of one or more sensor data sets from one or more sensors 112 based on the quality score of the data sets or the sensors 112. As an example and not by way of limitation, data-merchant system 122 may receive one or more offers to purchase one or more data sets from sensors 112. Data-merchant system 122 may then determine a price for the data sets based on an algorithm based on the quality score of the sensor data, such as for example the average price of the data set multiplied by the quality score as a percentage.

In particular embodiments, data-merchant system 122 may facilitate the purchase of various rights to data from sensors 112. The rights to sensor data that may be purchased include the right to own, the right to transfer, the right to use, the right to destroy, the right to modify, the right to reproduce, other suitable rights, or a combination of two or more such rights. These rights may be granted on an exclusive or non-exclusive basis. This disclosure contemplates the purchase of any suitable rights or set or rights to sensor data. In particular embodiments, data-merchant system 122 may facilitate the purchase of rights to data from sensors 112 for a variety of time periods. The rights to sensor data may be purchased permanently, temporarily, contingently, or for another suitable period. As an example and not by way of limitation, data-merchant system 122 may facilitate the purchase of a subscription to one or more data streams for a specific period of time. As another example, data-merchant system 122 may facilitate the purchase of a lease to one or more data streams for a specific period of time. As another example, data-merchant system 122 may facilitate the purchase of membership to a service that provides one or more data streams for a specific period of time. This disclosure contemplates the purchase of data sets for any suitable time period. In particular embodiments, data-merchant system 122 may provide access to one or more data sets for a specific period of time. As an example and not by way of limitation, data-merchant system 122 may continuously transmit one or more data streams to another system (such as for example purchaser-client system 130) for a specific period of time. As another example, data-merchant system 122 may host one or more data streams on a network-addressable system that may be accessed by another system. This disclosure contemplates any suitable method of providing access to data sets for specific periods of time.

In particular embodiments, data-merchant system 122 may facilitate the purchase of data from sensors 112 in exchange for a variety of types of consideration. Consideration for purchase of sensor data may include legal currency, virtual currency, goods, services, other suitable consideration, or a combination of two or more types of consideration. This disclosure contemplates the purchase of sensor data in exchange for any suitable consideration. In particular embodiments, the purchaser of sensor data may use the data for mining, targeted advertising, or other applications.

Particular embodiments may provide a standardized framework for the exchanges of sensor data. Sensors 112 may communicate using any suitable data format, such as for example JAVASCRIPT Object Notation (JSON), YAML Ain't Markup Language (or Yet Another Markup Language) (YAML), Hierarchical Data Format (HDF), Ordered Graph Data Language (OGDL), Extensible Markup Language (XML), or other suitable formats. As an example and not by way of limitation, sensors 112 in sensor network 114 may communicate sensor data using XML. Standardization may facilitate the interoperability among sensors 112, data-aggregator system 120, data-merchant system 122, and purchaser-client system 130. In particular embodiments, sensor data may be include definitions, categories, or other annotations in the header format of transport or routing protocols, and sensors may transmit one or more data streams using these options. These options may be identified by a type, relations, or subject, and may represent various sensor-related information.

Figure 2:
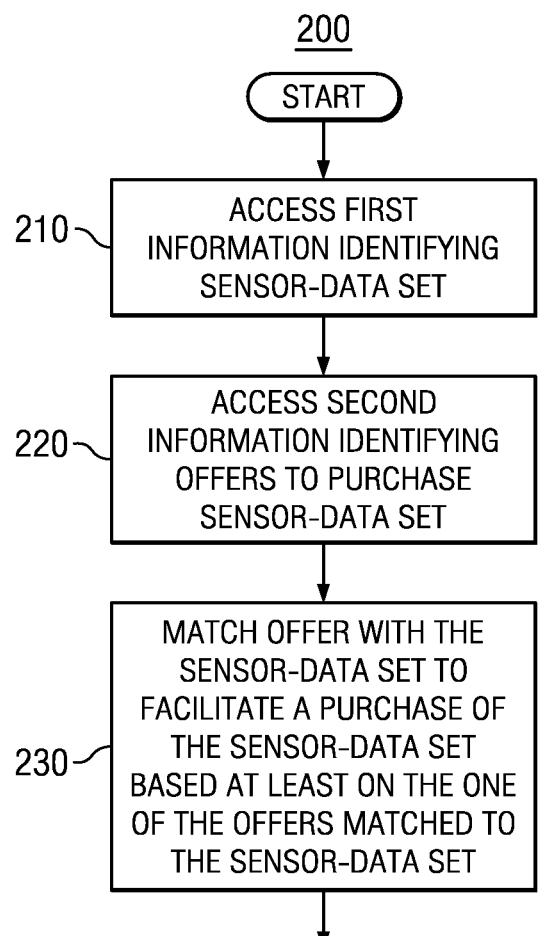
FIG. 2 illustrates an example method for providing a marketplace for sensor data.

FIG. 2 illustrates an example method for providing a marketplace for sensor data. The method begins at step 210, where data-merchant system 122 accesses first information identifying a sensor-data set that includes sensor data from multiple sensor-data streams from multiple sensors over a period of time. Data-aggregator system 120 has combined the sensor data from the sensor-data streams with each other based on a relationship of the sensor data streams to a sensor subject. At step 220, data-merchant system 122 accesses second information identifying one or more offers to purchase the data set. At step 230, data-merchant system 122 matches one of the offers with the sensor-data set to facilitate a purchase of the set of data based on the one of the offers matched to the set of data, at which point the method ends. Although this disclosure describes and illustrates particular steps of the method of FIG. 2 as occurring in a particular order, this disclosure contemplates any suitable steps of the method of FIG. 2 occurring in any suitable order. Moreover, although this disclosure describes and illustrates particular components carrying out particular steps of the method of FIG. 2, this disclosure contemplates any suitable combination of any suitable components carrying out any suitable steps of the method of FIG. 2.

Figure 3:
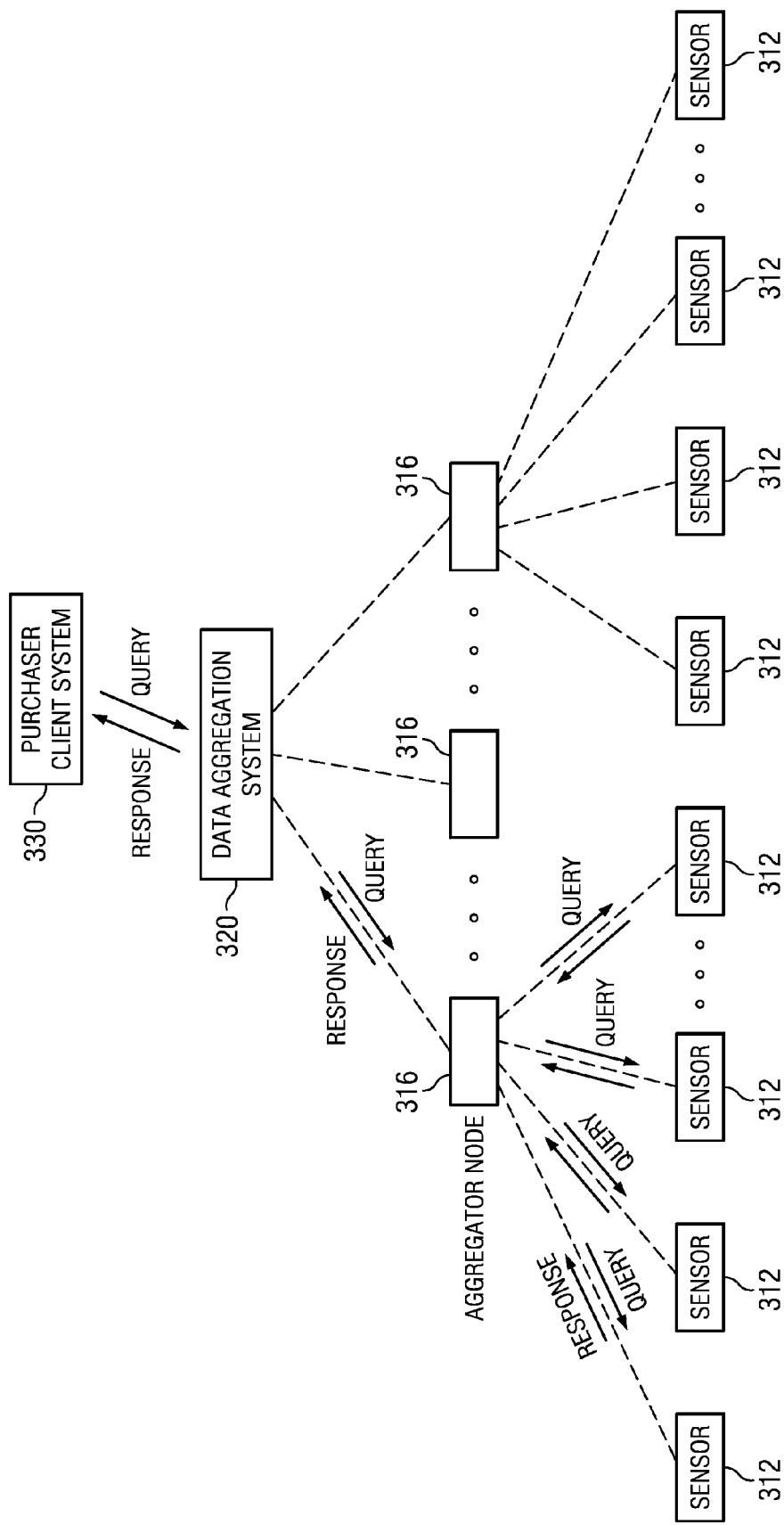
FIG. 3 illustrates an example system for aggregating sensor data for a marketplace.

FIG. 3 illustrates an example system 300 for aggregating sensor data. System 300 includes sensors 312, aggregator nodes 316, data-aggregator system 320, and purchaser-client system 330. Although FIG. 3 illustrates a particular arrangement of sensors 312, aggregator nodes 316, data-aggregator system 320, and purchaser-client system 330, this disclosure contemplates any suitable arrangement of sensors 312, aggregator nodes 316, data-aggregator system 320, and purchaser-client system 330. Moreover, although FIG. 3 illustrates a particular number of sensors 312, aggregator nodes 316, data-aggregator systems 320, and purchaser-client systems 330, this disclosure contemplates any suitable number of sensors 312, aggregator nodes 316, data-aggregator systems 320, and purchaser-client systems 330. Any suitable connections may connect sensors 312, aggregator nodes 316, data-aggregator system 320, and purchaser-client system 330.

In particular embodiments, an aggregator node 316 is a node in a system 300 that collects sensor-data from a set of sensors 312 (which may be a subset of all sensors 312 in a sensor network). The set of sensors 312 that an aggregator node 316 may collect sensor data from may, as an example and not by way of limitation, include sensors 312 that are within a physical or logical neighborhood of aggregator node 316. An aggregator node 316 may include one or more computer systems (such as, for example, servers) and may be unitary or distributed. An aggregator node 316 may include one or more aggregator nodes 316. Aggregator node 316 may provide an infrastructure for collecting and aggregating data from sensors 312. In particular embodiments, each aggregator node 316 is responsible for collecting sensor data from a set of sensors 312 in its physical or logical neighborhood. Aggregator node 316 may collect and aggregate a particular set of data from the set of sensors 312 or all sensor data generated by the set of sensors 312. Each sensor 312 may transmit a sensor-data stream to one or more aggregator nodes 316. As an example and not by way of limitation, each sensor 312 may transmit a sensor-data stream to the nearest aggregator node 316. A sensor 312 may periodically inform one or more aggregator nodes 316 about the sensor data that it has generated or may update its aggregator node 316 only when deemed necessary. In particular embodiments, aggregator nodes 316 may operate hierarchically, such that an aggregator node 316 may collect data from one or more other aggregator nodes 316.

In particular embodiments, a data-aggregator system 320 uses a query-response infrastructure with programmable primitives. As an example and not by way of limitation, a data-aggregator system 320 may receive one or more queries (such as, for example, from a purchaser-client system 330) for real-time sensor data from particular subjects. The data-aggregator system 320 may send one or more requests for the sensor data to aggregator nodes 316 and sensors 312. This request may include information describing the query and instruction for how to aggregate the sensor data from sensors 312. The sensors 312 may then respond by transmitting the requested sensor data to the aggregator nodes 316, which may aggregate the data and respond by transmitting the aggregated data to data-aggregator system 420.

In some embodiments, aggregator nodes 316 may be programmable to support any request or query for data from a purchaser-client system 330. In other embodiments, aggregator nodes 316 may have some pre-defined functions or macros over which the aggregator nodes 316 may aggregate. As an example and not by way of limitation, macros may include wavelet, FFT decomposition, or other fingerprinting techniques. In particular embodiments, macros may be hardware accelerated in DSPs and FPGAs, such as FFT, enabling wire speed summarization.

In particular embodiments, an aggregator node 316 may aggregate sensor data using spatial factors. An aggregator node 316 may collect data from one or more sensors 312 that are spatially nearby neighbors. Aggregator node 316 may then provide a statistical characterization of the sensor data generated by a set of sensors 312. As an example and not by way of limitation, an aggregator node 316 may provide a mean, median, mode, standard deviation, Gaussian distribution, log-normal, other suitable characterization of the data, or two or more such characterizations of the data. The aggregator node 316 may collect and provide the statistical characterization of the data in real-time, and transmit this data to data-aggregator system 320 in real-time.

In particular embodiments, an aggregator node 316 may aggregate sensor data using temporal factors. An aggregator node 316 may collect data from one or more sensors 312 based on a time-series of the sensor data. Aggregator node 316 may then provide a statistical characterization of the sensor data generated by a set of sensors 312. As an example and not by way of limitation, an aggregator node 316 may provide a moving average, or autoregressive or integrated or a combination of the aforementioned models. The time period over which aggregator node 316 may collect data may be any suitable finite time period. As an example and not by way of limitation, the time period may be a predefined window as defined by a query, request, macro, or function.

In particular embodiments, an aggregator node 316 may aggregate sensor data using both spatial and temporal factors. An aggregator node 316 may collect data from one or more sensors 312 based both the spacial proximity of the sensors 312 and on the time-series of the sensor data. In particular embodiments, complex sensor data with multidimensional and temporal characteristics may be aggregated using multilinear algebraic techniques (such as, for example, tensor decomposition) and aggregator node 316 may only transmit key coffecients to the data-aggregator system 320.

Figure 4:
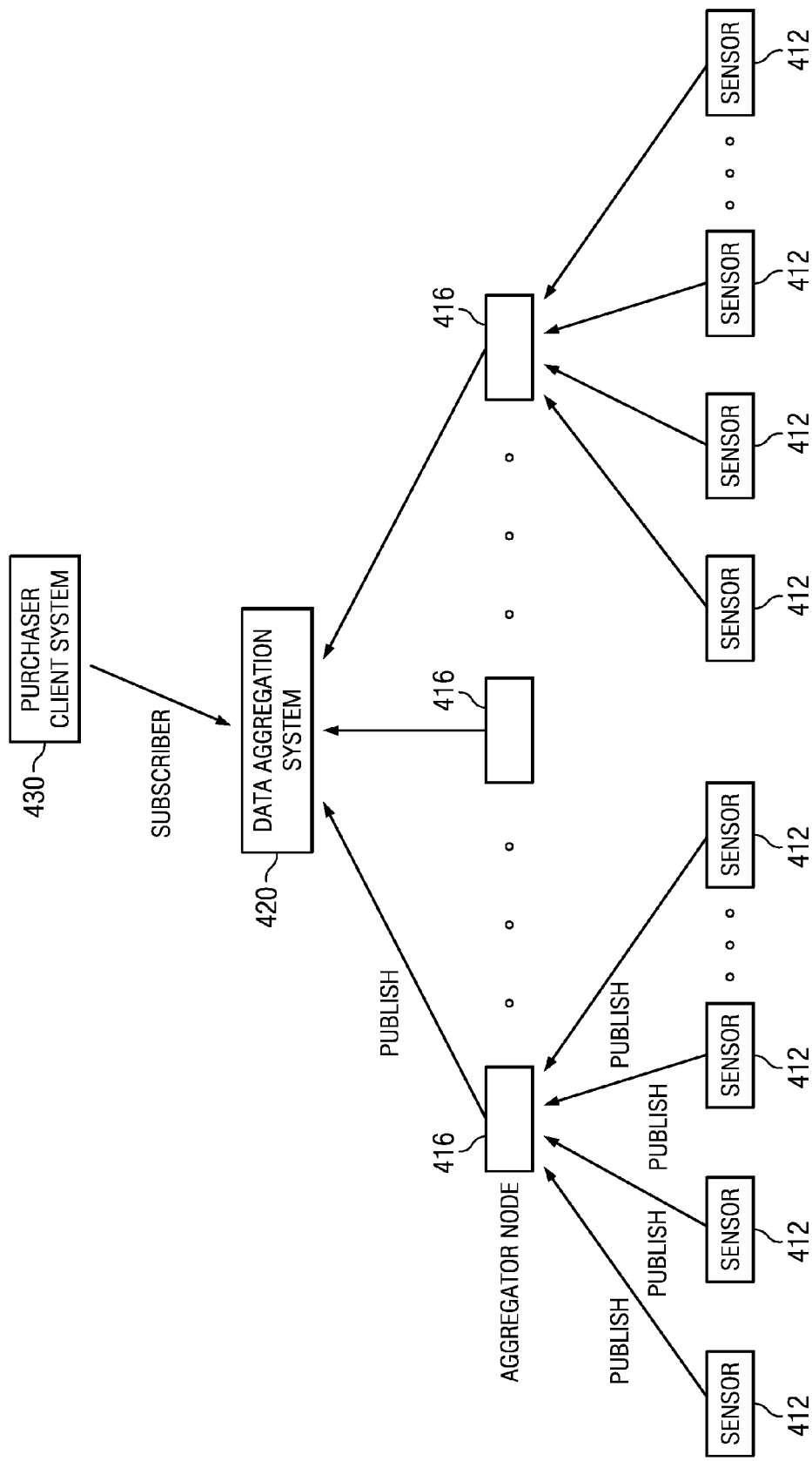
FIG. 4 illustrates another example system for aggregating sensor data for a marketplace.

FIG. 4 illustrates another example system 400 for aggregating sensor data. System 400 includes sensors 412, aggregator nodes 416, data-aggregator system 420, and purchaser-client system 430. Although FIG. 4 illustrates a particular arrangement of sensors 412, aggregator nodes 416, data-aggregator system 420, and purchaser-client system 430, this disclosure contemplates any suitable arrangement of sensors 412, aggregator nodes 416, data-aggregator system 420, and purchaser-client system 430. Moreover, although FIG. 4 illustrates a particular number of sensors 412, aggregator nodes 416, data-aggregator systems 420, and purchaser-client systems 430, this disclosure contemplates any suitable number of sensors 412, aggregator nodes 416, data-aggregator systems 420, and purchaser-client systems 430. Any suitable connections may connect sensors 412, aggregator nodes 416, data-aggregator system 420, and purchaser-client system 430.

In particular embodiments, a data-aggregator system 420 uses a publish-subscribe infrastructure with programmable primitives. As an example and not by way of limitation, a data-aggregator system 420 may receive one or more queries (such as, for example, from a purchaser-client system 430) for real-time sensor data in a particular geographic area. The data-aggregator system 420 may send one or more requests for the sensor data to aggregator nodes 416 and sensors 412. This request may include information describing the query and instruction for how to aggregate the sensor data from sensors 412. The sensors 412 may then publish sensor data to the aggregator nodes 416, which may aggregate the data and publish the data to data-aggregator system 420. In particular embodiments, a user of purchaser-client system 430 may subscribe to data-aggregator system 420 and may receive push notification of aggregated data being aggregator node 416 and statistical characterizations of sensor data from aggregator node 416.

Figure 5:
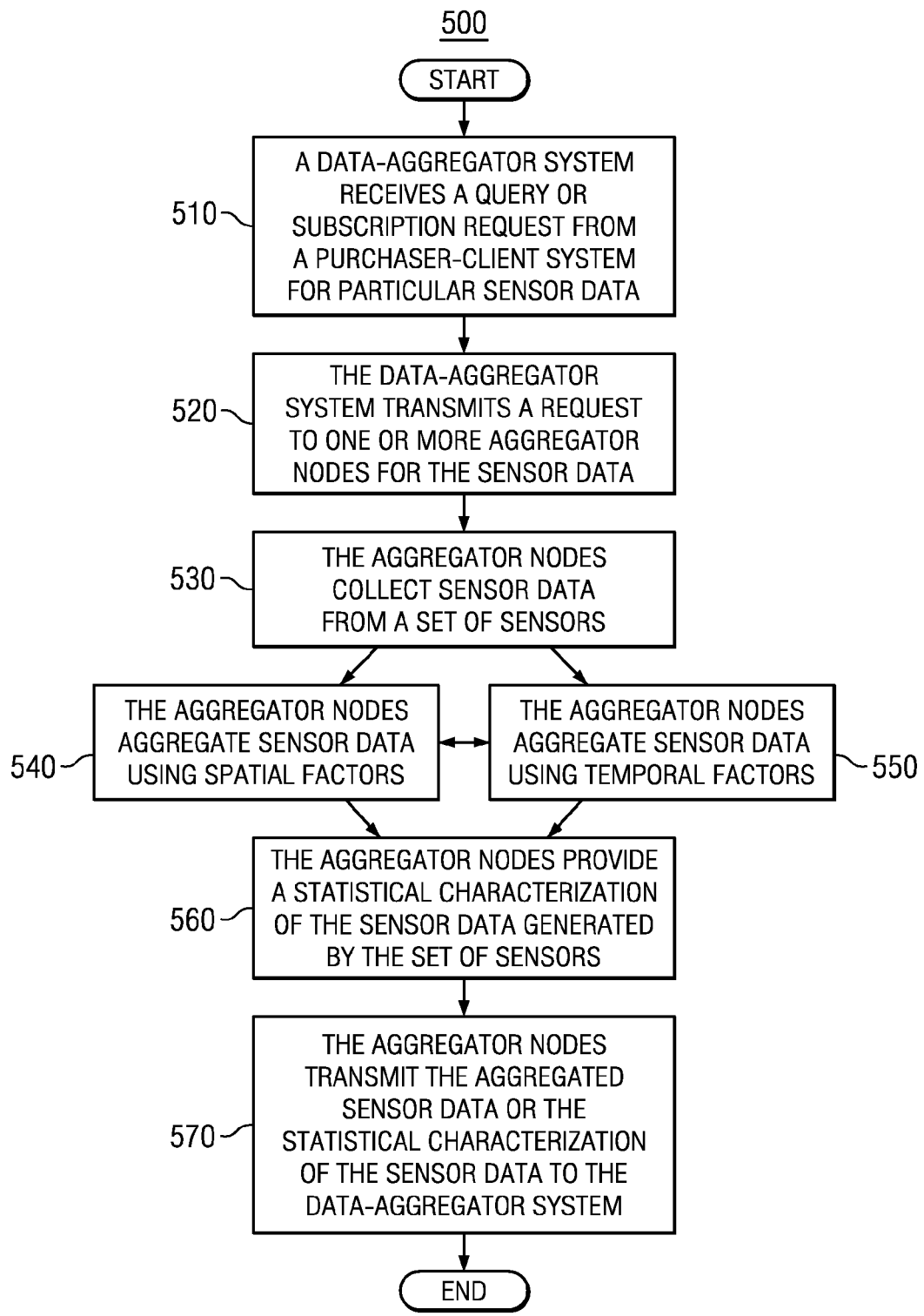
FIG. 5 illustrates an example method for aggregating sensor data for a marketplace.

FIG. 5 illustrates an example method 500 for aggregating sensor data for a marketplace for sensor data. The method begins at step 510, where data-aggregator system 320 receives a query or subscription request from a purchaser-client system 330 for particular sensor data. At step 520, the data-aggregator system 320 transmits a request to one or more aggregator nodes 316 for the sensor data. At step 530, the aggregator nodes 316 collect sensor data from a set of sensors 312. Next, the aggregator nodes 316 may aggregate sensor data using spatial factors at step 540, temporal factors at step 550, or both. At step 560, the aggregator nodes 316 provide a statistical characterization of the sensor data generated by the set of sensors 312. At step 570, the aggregator nodes 316 transmit the aggregated sensor data or the statistical characterization of the sensor data to the data-aggregator system 320. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates particular components carrying out particular steps of the method of FIG. 5, this disclosure contemplates any suitable combination of any suitable components carrying out any suitable steps of the method of FIG. 5.

Figure 6:
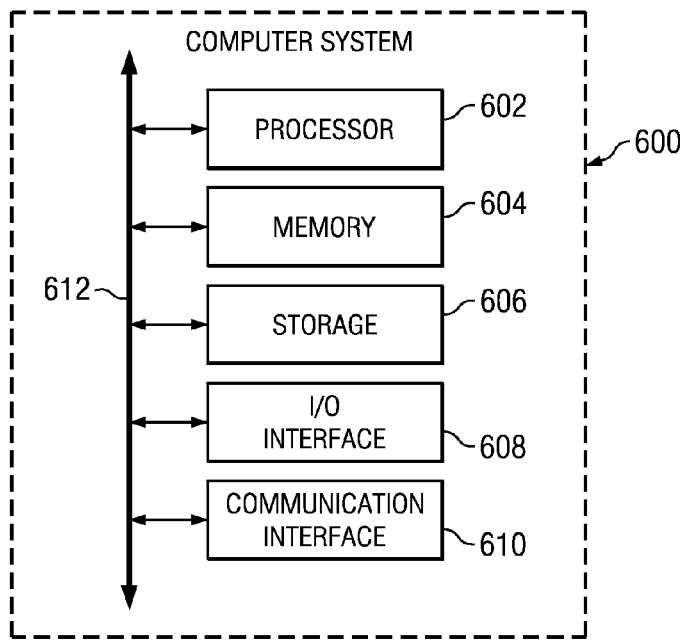
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 600 may include one or more computer systems 600; be unitary or distributed; span multiple locations; span multiple machines; span multiple datacenters; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include an HDD, a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 602 (such as, for example, one or more internal registers or caches), one or more portions of memory 604, one or more portions of storage 606, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

Figure 7:
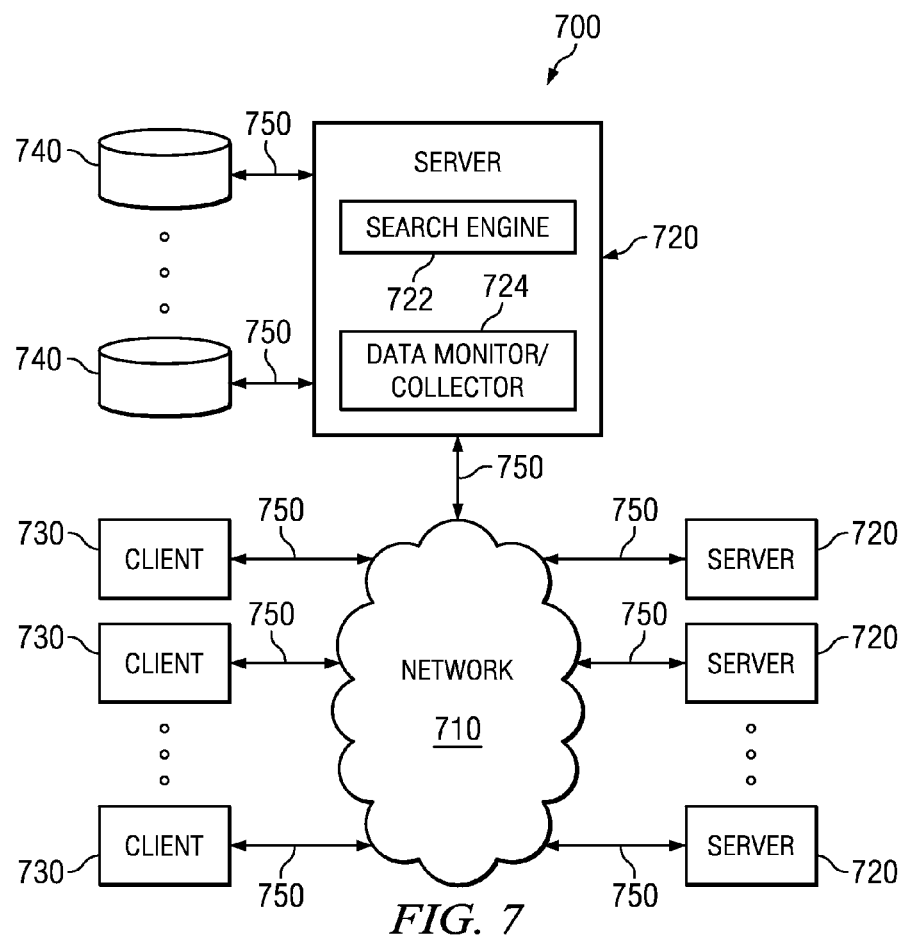
FIG. 7 illustrates an example network environment.

FIG. 7 illustrates an example network environment 700. This disclosure contemplates any suitable network environment 700. As an example and not by way of limitation, although this disclosure describes and illustrates a network environment 700 that implements a client-server model, this disclosure contemplates one or more portions of a network environment 700 being peer-to-peer, where appropriate. Particular embodiments may operate in whole or in part in one or more network environments 700. In particular embodiments, one or more elements of network environment 700 provide functionality described or illustrated herein. Particular embodiments include one or more portions of network environment 700. Network environment 700 includes a network 710 coupling one or more servers 720 and one or more clients 730 to each other. This disclosure contemplates any suitable network 710. As an example and not by way of limitation, one or more portions of network 710 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 710 may include one or more networks 710.

Links 750 couple servers 720 and clients 730 to network 710 or to each other. This disclosure contemplates any suitable links 750. As an example and not by way of limitation, one or more links 750 each include one or more wireline (such as, for example, Digital Subscriber Line (DSL) or Data Over Cable Service Interface Specification (DOCSIS)), wireless (such as, for example, Wi-Fi or Worldwide Interoperability for Microwave Access (WiMAX)) or optical (such as, for example, Synchronous Optical Network (SONET) or Synchronous Digital Hierarchy (SDH)) links 750. In particular embodiments, one or more links 750 each includes an intranet, an extranet, a VPN, a LAN, a WLAN, a WAN, a MAN, a communications network, a satellite network, a portion of the Internet, or another link 750 or a combination of two or more such links 750. Links 750 need not necessarily be the same throughout network environment 700. One or more first links 750 may differ in one or more respects from one or more second links 750.

This disclosure contemplates any suitable servers 720. As an example and not by way of limitation, one or more servers 720 may each include one or more advertising servers, applications servers, catalog servers, communications servers, database servers, exchange servers, fax servers, file servers, game servers, home servers, mail servers, message servers, news servers, name or DNS servers, print servers, proxy servers, sound servers, standalone servers, web servers, or web-feed servers. In particular embodiments, a server 720 includes hardware, software, or both for providing the functionality of server 720. As an example and not by way of limitation, a server 720 that operates as a web server may be capable of hosting websites containing web pages or elements of web pages and include appropriate hardware, software, or both for doing so. In particular embodiments, a web server may host HTML or other suitable files or dynamically create or constitute files for web pages on request. In response to a Hyper Text Transfer Protocol (HTTP) or other request from a client 730, the web server may communicate one or more such files to client 730. As another example, a server 720 that operates as a mail server may be capable of providing e-mail services to one or more clients 730. As another example, a server 720 that operates as a database server may be capable of providing an interface for interacting with one or more data stores (such as, for example, data stores 770 described below). Where appropriate, a server 720 may include one or more servers 720; be unitary or distributed; span multiple locations; span multiple machines; span multiple datacenters; or reside in a cloud, which may include one or more cloud components in one or more networks.

In particular embodiments, one or more links 750 may couple a server 720 to one or more data stores 740. A data store 740 may store any suitable information, and the contents of a data store 740 may be organized in any suitable manner. As an example and not by way or limitation, the contents of a data store 740 may be stored as a dimensional, flat, hierarchical, network, object-oriented, relational, XML, or other suitable database or a combination or two or more of these. A data store 740 (or a server 720 coupled to it) may include a database-management system or other hardware or software for managing the contents of data store 740. The database-management system may perform read and write operations, delete or erase data, perform data deduplication, query or search the contents of data store 740, or provide other access to data store 740.

In particular embodiments, one or more servers 720 may each include one or more search engines 722. A search engine 722 may include hardware, software, or both for providing the functionality of search engine 722. As an example and not by way of limitation, a search engine 722 may implement one or more search algorithms to identify network resources in response to search queries received at search engine 722, one or more ranking algorithms to rank identified network resources, or one or more summarization algorithms to summarize identified network resources. In particular embodiments, a ranking algorithm implemented by a search engine 722 may use a machine-learned ranking formula, which the ranking algorithm may obtain automatically from a set of training data constructed from pairs of search queries and selected Uniform Resource Locators (URLs), where appropriate.

In particular embodiments, one or more servers 720 may each include one or more data monitors/collectors 724. A data monitor/collection 724 may include hardware, software, or both for providing the functionality of data collector/collector 724. As an example and not by way of limitation, a data monitor/collector 724 at a server 720 may monitor and collect network-traffic data at server 720 and store the network-traffic data in one or more data stores 740. In particular embodiments, server 720 or another device may extract pairs of search queries and selected URLs from the network-traffic data, where appropriate.

This disclosure contemplates any suitable clients 730. A client 730 may enable a user at client 730 to access or otherwise communicate with network 710, servers 720, or other clients 730. As an example and not by way of limitation, a client 730 may have a web browser, such as MICROSOFT INTERNET EXPLORER or MOZILLA FIREFOX, and may have one or more add-ons, plug-ins, or other extensions, such as GOOGLE TOOLBAR or YAHOO TOOLBAR. A client 730 may be an electronic device including hardware, software, or both for providing the functionality of client 730. As an example and not by way of limitation, a client 730 may, where appropriate, be an embedded computer system, an SOC, an SBC (such as, for example, a COM or SOM), a desktop computer system, a laptop or notebook computer system, an interactive kiosk, a mainframe, a mesh of computer systems, a mobile telephone, a PDA, a netbook computer system, a server, a tablet computer system, or a combination of two or more of these. Where appropriate, a client 730 may include one or more clients 730; be unitary or distributed; span multiple locations; span multiple machines; span multiple datacenters; or reside in a cloud, which may include one or more cloud components in one or more networks.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by one or more processors associated with one or more computer systems:
   accessing, by one or more of the processors, a sensor-data set comprising sensor data from a plurality of sensor-data streams from a plurality of sensors over a period of time, the sensor data from the sensor-data streams having been combined with each other based on a relationship of the sensor data to a sensor subject;
   accessing, by one or more of the processors, one or more offers to purchase the sensor-data set, wherein the one or more offers to purchase the sensor-data set are receive from one or more purchasers, respectively;
   matching, by one or more of the processors, a first offer from the one or more offers received from a first purchaser with the sensor-data set to facilitate a purchase of the sensor-data set based at least on the one of the offers matched to the sensor-data set; and
   transmitting, by one or more of the processors, the sensor-data set to the first purchaser.

2. The method of claim 1, wherein the sensor data from the sensor-data streams has been combined with each other further based on tags in the sensor data indicating their relationship to the sensor subject.

3. The method of claim 2, wherein one or more of the tags each comprise a sensor identifier (ID) of a sensor.

4. The method of claim 3, wherein the sensor ID of the sensor comprises one or more of:
   a network address of the sensor;
   an ID of a network interface of the sensor;
   an indication of the subject of the sensor;
   geographic information about the sensor; or
   information about one or more properties of the sensor.

5. The method of claim 2, wherein, to combine the sensor data from the sensor-data streams with each other based on tags in the sensor data indicating their relationship to the sensor subject, the tags have been queried to one or more records indicating the sensor subject associated with the tags.

6. The method of claim 5, wherein the record is a lookup table.

7. The method of claim 1, wherein the sensor data from the sensor-data streams has been combined with each other using spatial factors.

8. The method of claim 1, wherein the sensor data from the sensor-data streams has been combined with each other using temporal factors.

9. The method of claim 1, wherein the sensor data from the sensor-data streams has been combined with each other using both spatial and temporal factors.

10. The method of claim 1, wherein the sensor subject is a particular person or group of persons.

11. The method of claim 1, wherein each offer to purchase the sensor-data set is one of a subscription, a membership, or a barter agreement.

12. The method of claim 1, wherein:
    each offer to purchase the sensor-data set is a monetary bid; and
    matching the first offer from the one or more offers received from the first purchaser with the sensor-data set to facilitate the purchase of the sensor-data set comprises identifying the offer comprising the highest monetary bid.

13. The method of claim 1, wherein the relationship of the sensor data to the sensor subject is the sensor data is related to a particular characteristic of the sensor subject.

14. The method of claim 1, wherein the relationship of the sensor data to the sensor subject is the sensor data is related to a particular trend in the sensor data of the sensor subject.

15. The method of claim 1, wherein the relationship of the sensor data to the sensor subject is the sensor data is related to a particular model for making predictions concerning to the sensor subject.

16. The method of claim 1, wherein accessing the sensor-data set comprise accessing one or more data stores comprising the sensor-data set.

17. The method of claim 1, wherein accessing the sensor-data set comprise accessing the plurality of sensor-data streams and combining the sensor data from the sensor-data streams to generate the sensor-data set.

18. The method of claim 1, wherein matching the first offer from the one or more offers received from the first purchaser with the sensor-data set to facilitate the purchase of the sensor-data set comprises executing an auction.

19. The method of claim 18, wherein the auction is one of a Dutch auction, a Vickrey auction, a reverse auction, a short-bid auction, or an English auction.

20. One or more computer-readable non-transitory storage media embodying instructions that are operable when executed to:
   access a sensor-data set comprising sensor data from a plurality of sensor-data streams from a plurality of sensors over a period of time, the sensor data from the sensor-data streams having been combined with each other based on a relationship of the sensor data to a sensor subject;
   access one or more offers to purchase the sensor-data set, wherein the one or more offers to purchase the sensor-data set are receive from one or more purchasers, respectively;
   match a first offer from the one or more offers received from a first purchaser with the sensor-data set to facilitate a purchase of the sensor-data set based at least on the one of the offers matched to the sensor-data set; and
   transmit the sensor-data set to the first purchaser.

21. The media of claim 20, wherein the sensor data from the sensor-data streams has been combined with each other further based on tags in the sensor data indicating their relationship to the sensor subject.

22. The media of claim 21, wherein one or more of the tags each comprise a sensor identifier (ID) of a sensor.

23. The media of claim 22, wherein the sensor ID of the sensor comprises one or more of:
   a network address of the sensor;
   an ID of a network interface of the sensor;
   an indication of the subject of the sensor;
   geographic information about the sensor; or
   information about one or more properties of the sensor.

24. The media of claim 21, wherein, to combine the sensor data from the sensor-data streams with each other based on tags in the sensor data indicating their relationship to the sensor subject, the tags have been queried to one or more records indicating the sensor subject associated with the tags.

25. The media of claim 24, wherein the record is a lookup table.

26. The media of claim 20, wherein the sensor data from the sensor-data streams has been combined with each other using spatial factors.

27. The media of claim 20, wherein the sensor data from the sensor-data streams has been combined with each other using temporal factors.

28. The media of claim 20, wherein the sensor data from the sensor-data streams has been combined with each other using both spatial and temporal factors.

29. The media of claim 20, wherein the sensor subject is a particular person or group of persons.

30. The media of claim 20, wherein each offer to purchase the sensor-data set is one of a subscription, a membership, or a barter agreement.

31. The media of claim 20, wherein:
   each offer to purchase the sensor-data set is a monetary bid; and
   matching the first offer from the one or more offers received from the first purchaser with the sensor-data set to facilitate the purchase of the sensor-data set comprises identifying the offer comprising the highest monetary bid.

32. The media of claim 20, wherein the relationship of the sensor data to the sensor subject is the sensor data is related to a particular characteristic of the sensor subject.

33. The media of claim 20, wherein the relationship of the sensor data to the sensor subject is the sensor data is related to a particular trend in the sensor data of the sensor subject.

34. The media of claim 20, wherein the relationship of the sensor data to the sensor subject is the sensor data is related to a particular model for making predictions concerning to the sensor subject.

35. The media of claim 20, wherein accessing the sensor-data set comprise accessing one or more data stores comprising the sensor-data set.

36. The media of claim 20, wherein accessing the sensor-data set comprise accessing the plurality of sensor-data streams and combining the sensor data from the sensor-data streams to generate the sensor-data set.

37. The media of claim 20, wherein matching the first offer from the one or more offers received from the first purchaser with the sensor-data set to facilitate the purchase of the sensor-data set comprises executing an auction.

38. The media of claim 37, wherein the auction is one of a Dutch auction, a Vickrey auction, a reverse auction, a short-bid auction, or an English auction.

39. An apparatus comprising: a memory comprising instructions executable by one or more processors; and one or more processors coupled to the memory and operable to execute the instructions, the one or more processors being operable when executing the instructions to:
   access a sensor-data set comprising sensor data from a plurality of sensor-data streams from a plurality of sensors over a period of time, the sensor data from the sensor-data streams having been combined with each other based on a relationship of the sensor data to a sensor subject;
   access one or more offers to purchase the sensor-data set, wherein the one or more offers to purchase the sensor-data set are receive from one or more purchasers, respectively;
   match a first offer from the one or more offers received from a first purchaser with the sensor-data set to facilitate a purchase of the sensor-data set based at least on the one of the offers matched to the sensor-data set; and
   transmit the sensor-data set to the first purchaser.

40. A system comprising:
   means for accessing a sensor-data set comprising sensor data from a plurality of sensor-data streams from a plurality of sensors over a period of time, the sensor data from the sensor-data streams having been combined with each other based on a relationship of the sensor data to a sensor subject;
   means for accessing one or more offers to purchase the sensor-data set, wherein the one or more offers to purchase the sensor-data set are receive from one or more purchasers, respectively;
   means for matching a first offer from the one or more offers received from a first purchaser with the sensor-data set to facilitate a purchase of the sensor-data set based at least on the one of the offers matched to the sensor-data set; and
   means for transmitting the sensor-data set to the first purchaser.

* * * * *